(12) United States Patent
Yoeli

(10) Patent No.: US 11,242,141 B2
(45) Date of Patent: Feb. 8, 2022

(54) METHOD OF DRAG REDUCTION ON VEHICLE WITH INTERNAL ROTORS

(71) Applicant: URBAN AERONAUTICS, LTD., Yavne (IL)

(72) Inventor: Raphael Yoeli, Yavne (IL)

(73) Assignee: URBAN AERONAUTICS, LTD., Yavne (IL)

( * ) Notice: Subject to any disclaimer, the term of this patent is extended or adjusted under 35 U.S.C. 154(b) by 202 days.

(21) Appl. No.: 16/479,688

(22) PCT Filed: Jan. 22, 2018

(86) PCT No.: PCT/IB2018/050383
§ 371 (c)(1),
(2) Date: Jul. 22, 2019

(87) PCT Pub. No.: WO2018/134795
PCT Pub. Date: Jul. 26, 2018

(65) Prior Publication Data
US 2020/0339255 A1    Oct. 29, 2020

Related U.S. Application Data

(60) Provisional application No. 62/449,193, filed on Jan. 23, 2017.

(51) Int. Cl.
*B64C 29/00*    (2006.01)
(52) U.S. Cl.
CPC ............... *B64C 29/0025* (2013.01)

(58) Field of Classification Search
CPC .. B64C 27/20; B64C 29/0025; B64C 29/0033
See application file for complete search history.

(56) References Cited

U.S. PATENT DOCUMENTS

| | | | | | |
|---|---|---|---|---|---|
| 2,955,780 | A | * | 10/1960 | Hulbert | B64C 27/20 244/23 R |
| 2,968,453 | A | * | 1/1961 | Bright | B64C 29/0025 244/12.5 |
| 3,184,183 | A | * | 5/1965 | Plasecki | B64C 27/20 244/23 R |
| 4,171,784 | A | * | 10/1979 | Eickmann | B64C 11/28 244/102 R |
| 4,537,372 | A | * | 8/1985 | Forizs | B64C 29/0033 244/12.4 |
| 6,464,166 | B1 | | 10/2002 | Yoeli | |
| 7,032,861 | B2 | * | 4/2006 | Sanders, Jr. | B64C 27/12 244/12.1 |

(Continued)

OTHER PUBLICATIONS

International Search Report dated May 1, 2018 issued in PCT International Patent Application No. PCT/IB2018/050383, 1 page.

*Primary Examiner* — Joseph W Sanderson
(74) *Attorney, Agent, or Firm* — Nixon & Vanderhye P.C.

(57) ABSTRACT

A vertical take-off and landing (VTOL) airborne vehicle includes a fuselage, a front vertical thrust fan positioned forward of the fuselage and rotating in a first plane, and a rear vertical thrust fan positioned rearward of the fuselage and rotating in a second plane above the first plane. The relative positioning of the front and rear vertical thrust fans changes the distribution of aerodynamic forces on an upper profile of the fuselage to reduce drag.

12 Claims, 6 Drawing Sheets

(56) References Cited

U.S. PATENT DOCUMENTS

| | | | |
|---|---|---|---|
| 7,188,803 B2 * | 3/2007 | Ishiba | B60F 5/02 244/23 R |
| 8,342,441 B2 * | 1/2013 | Yoeli | B64C 29/0033 244/12.4 |
| 8,496,200 B2 * | 7/2013 | Yoeli | B64C 29/0025 244/23 B |
| 8,622,335 B2 * | 1/2014 | Yoeli | B64C 27/08 244/12.3 |
| 8,651,432 B2 * | 2/2014 | De Roche | B64C 27/20 244/221 |
| 9,085,355 B2 * | 7/2015 | DeLorean | B64C 39/04 |
| 9,132,915 B2 * | 9/2015 | Zhu | B64C 29/0025 |
| 9,682,772 B2 * | 6/2017 | Yoon | B60F 5/003 |
| 9,845,152 B2 * | 12/2017 | Stan | B64C 29/0008 |
| 10,040,544 B2 * | 8/2018 | Marcel | B64D 27/24 |
| 10,730,622 B2 * | 8/2020 | Groninga | B64C 13/04 |
| 10,994,838 B2 * | 5/2021 | DeLorean | B64C 39/10 |
| 2005/0230524 A1 * | 10/2005 | Ishiba | B60F 5/02 244/23 A |
| 2007/0290097 A1 * | 12/2007 | Ishiba | B64C 29/0025 244/12.1 |
| 2010/0051740 A1 | 3/2010 | Yoeli | |
| 2010/0051753 A1 | 3/2010 | Yoeli | |
| 2011/0049306 A1 * | 3/2011 | Yoeli | B64C 29/0025 244/23 A |
| 2013/0112804 A1 * | 5/2013 | Zhu | B64C 3/56 244/2 |
| 2014/0124613 A1 | 5/2014 | Yang | |
| 2014/0158816 A1 | 6/2014 | DeLorean | |
| 2016/0001872 A1 * | 1/2016 | Zhu | B64C 37/00 244/49 |
| 2016/0375982 A1 * | 12/2016 | Rifenburgh | B64D 27/04 244/17.19 |
| 2017/0036760 A1 * | 2/2017 | Stan | B64C 11/001 |

* cited by examiner

METHOD OF DRAG REDUCTION ON VEHICLE WITH INTERNAL ROTORS

CROSS-REFERENCES TO RELATED APPLICATIONS

This application is the U.S. national phase of International Application No. PCT/IB2018/050383 filed Jan. 22, 2018 which designated the U.S. and claims priority to U.S. Provisional Patent Application No. 62/449,193 filed Jan. 23, 2017, the entire contents of each of which are hereby incorporated by reference.

STATEMENT REGARDING FEDERALLY SPONSORED RESEARCH OR DEVELOPMENT (NOT APPLICABLE)

BACKGROUND

Airborne vehicles with short or vertical takeoff capabilities that are thrusted vertically by propeller or fan typically have high efficiency factor in usage of on-board power for substantially vertical movements, yet such propelling means may suffer undesired aerodynamic effects when these thrust means are subject to cross-flow of air over the propeller or fan.

BRIEF SUMMARY

The front and rear vertical thrust fans on a vertical take-off and landing (VTOL) airborne vehicle may be relatively positioned to change the distribution of aerodynamic forces on an upper profile of the fuselage to reduce drag.

In an exemplary embodiment, the VTOL airborne vehicle includes a fuselage, a front vertical thrust fan, and a rear vertical thrust fan. The front vertical thrust fan is positioned forward of the fuselage relative to a forward direction of flight and rotates in a first plane. The second vertical thrust fan is positioned rearward of the fuselage and rotates in a second plane above the first plane.

The fuselage may include an airfoil shape along a longitudinal section. A leading edge of the airfoil-shaped fuselage may face the front vertical thrust fan and may be positioned above the first plane. A trailing edge of the airfoil-shaped fuselage may be positioned behind and below a forward edge of the rear vertical thrust fan such that the forward edge of the rear vertical thrust fan is positioned adjacent an upper profile of the airfoil-shaped fuselage between the leading edge and the trailing edge. A distribution of aerodynamic pressure on the upper profile may define a negative pressure area resulting in forces acting outward to the upper profile and a positive pressure area resulting in forces acting inward to the upper profile, and the forward edge of the rear vertical thrust fan may be positioned at a border line between the negative pressure area and the positive pressure area.

In some embodiments, the vehicle includes two sets of vanes positioned in an airflow path of the rear vertical thrust fan, where the two sets of vanes may be positioned below the rear vertical thrust fan. At least one of the two sets of vanes may be positioned higher than a trailing edge of the airfoil-shaped fuselage. The two sets of vanes may be spaced a maximum amount possible while preventing either of the two vane sets from exceeding out of a body contour line of the VTOL airborne vehicle.

In another exemplary embodiment, a VTOL airborne vehicle includes a fuselage having an airfoil shape along a longitudinal section, a front vertical thrust fan and a rear vertical thrust fan. The front vertical thrust fan is positioned forward of the fuselage relative to a forward direction of flight, where the front vertical thrust fan rotates in a first plane. The rear vertical thrust fan rotates in a second plane above the first plane. A leading edge of the airfoil-shaped fuselage faces the front vertical thrust fan and is positioned above the first plane, and a trailing edge of the airfoil-shaped fuselage is positioned behind and below a forward edge of the rear vertical thrust fan.

In yet another exemplary embodiment, a method of reducing drag in a vertical take-off and landing (VTOL) airborne vehicle includes the steps of positioning the front vertical thrust fan forward of the fuselage relative to a forward direction of flight with the front vertical thrust fan rotating in a first plane, and positioning the rear vertical thrust fan rearward of the fuselage with the rear vertical thrust fan rotating in a second plane above the first plane.

BRIEF DESCRIPTION OF THE DRAWINGS

The invention, both as to organization and method of operation, together with objects, features, and advantages thereof, may best be understood by reference to the following detailed description when read with the accompanying drawings in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
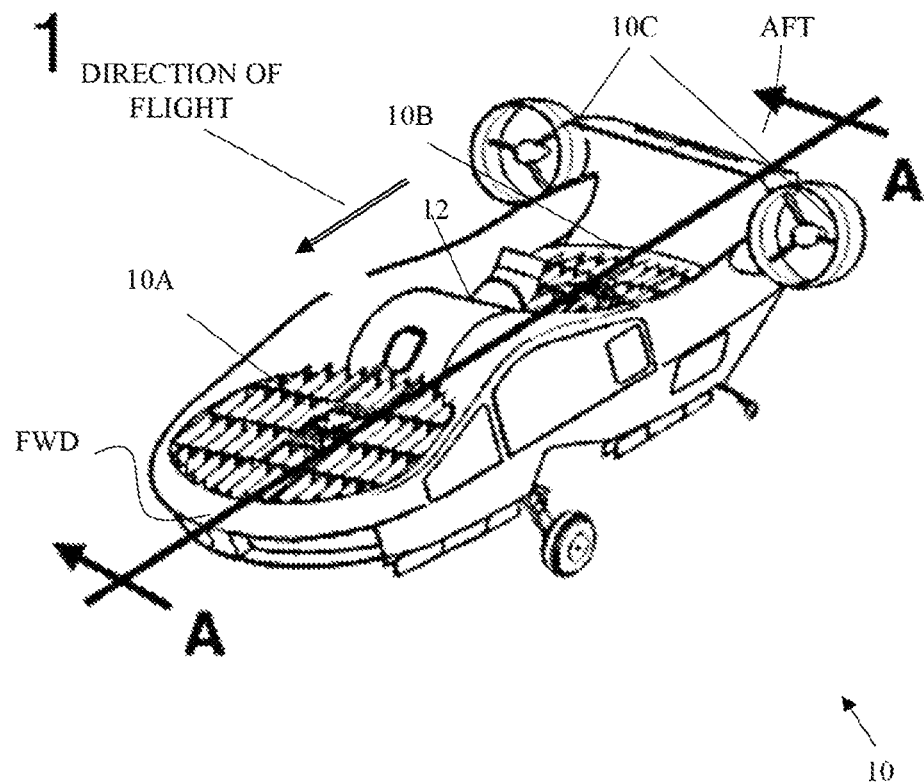
FIG. 1 schematically presents an airborne vehicle with vertical takeoff and landing (VTOL) capabilities.

Reference is made to FIG. 1, which schematically presents airborne vehicle 10 with vertical takeoff and landing (VTOL) capabilities. Vehicle 10 may comprise, disposed within fuselage 10A, a plurality of vertical thrust fans, propellers or rotors $10B_{FWD}$, $10B_{AFT}$, a plurality of horizontal thrust fans 10C, adapted to thrust vehicle 10 forward, so that its leading edge FWD leads and its trailing edge AFT follows, or to thrust vehicle 10 backward. Fans $10B_{FWD}$, $10B_{AFT}$ may be, in some embodiments, ducted fans. Airfoil shaped fuselage element 12 is disposed between fans $10B_{FWD}$ and $10B_{AFT}$ along the longitudinal axis of vehicle 10. Airfoil shaped fuselage element 12 has typically an aerodynamic form to properly guide airflow into aft fan $10B_{AFT}$. In a vehicle such as vehicle 10, the airflow patterns over the vehicle fuselage in general, and over and through fans $10B_{FWD}$ and $10B_{AFT}$, have substantial influence on the overall performance of vehicle 10 during flight. For example, in forward flight maneuvering the effect of the airflow patterns through and over fans $10B_{FWD}$ and $10B_{AFT}$ may have large impact on the thrust performance of the fans, an impact that may highly depend on the magnitude of the forward airspeed of vehicle 10.

Figures 2A, 2B:
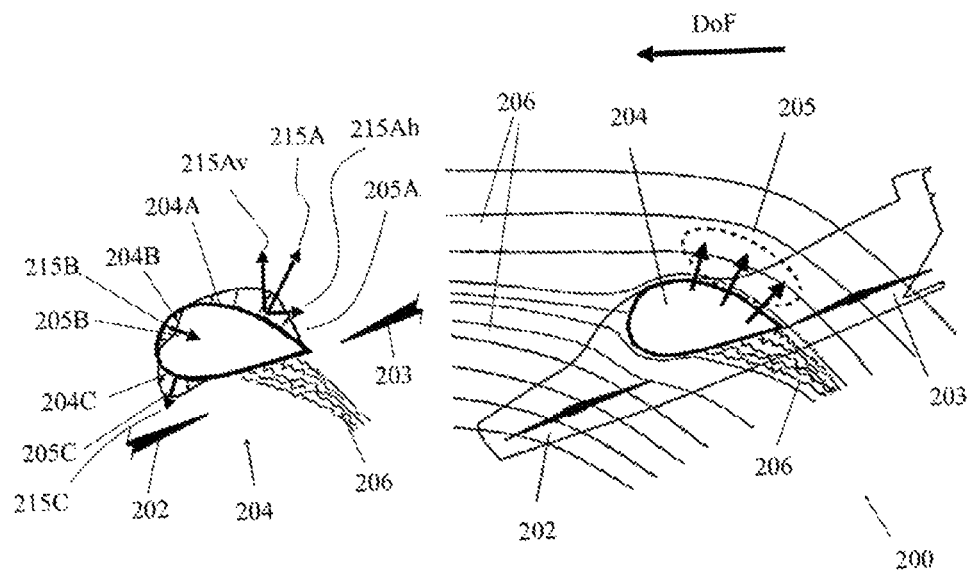
FIG. 2A schematically depicts a cross section of a VTOL vehicle along cross section line drawn in FIG. 1.
FIG. 2B schematically depicts the distribution of aerodynamic forces perpendicular to the on a airfoil shaped fuselage element.

Reference is made now to FIG. 2A, schematically depicting cross section 200 of vehicle 10, along cross section line A-A. Cross section 200 depicts front fan 202 and rear fan 203, located substantially in a common plane comprising also the planes of their disks of rotation. Airfoil shaped fuselage element 204 is located between front fan 202 and rear fan 203, with its bottom portion close to the common plane of fans 202 and 203. Schematic representation of the airflow path through fans (sometimes called in the literature also propellers or rotors) 202 and 203 is depicted by flow lines 206, approaching vehicle cross section 200 from its forward edge, flowing over airfoil shaped fuselage element 204 and through fans 202 and 203. Turbulent and/or separated flow of air behind airfoil shaped fuselage element 204 is depicted by turbulent-like lines 206. Fans 202 and 203 are presented located in a plane that is substantially parallel to the plane of the bottom side of vehicle 200 and substantially in a co-plane with the lower face of airfoil shaped fuselage element 204, as is common with certain designs of similar fans, VTOL airborne vehicles. However, it will be apparent to those skilled in the art that each of the fans may be oriented canted about a lateral axis between maximal backward angle, for example −5°, to maximal forward angle, for example +30°. Further, the front and rear fans may be positioned in differently elevated planes in the VTOL vehicle. Accordingly, fan 203 rotates behind airfoil shaped fuselage element 204 (with respect to the direction of flight DoF) with the forward portion of its disk of rotation located closely behind airfoil shaped fuselage element 204, and next to its trailing edge.

Reference is made now also to FIG. 2B, depicting distribution of aerodynamic forces perpendicular to the outer surfaces of airfoil shaped fuselage element 204, as developing in flow state depicted in FIG. 2A, for example during forward flight. Schematically, the vertical aerodynamic forces may be divided to three parts, as developing each on a different area on airfoil shaped fuselage element 204: 204A, 204B and 204C, with corresponding aerodynamic perpendicular force graphs 205A, 205B and 205C, respectively. As is evident from FIGS. 2A and 2B, the combined aerodynamic force of section 204B produces drag force acting on vehicle 200 in a direction 215B. The combined aerodynamic force of section 204C produces lift force in direction 215C. The combined aerodynamic force of section 204A produces lift force in direction 215A. Combined aerodynamic force 215A has useful component 215Av directed substantially, vertically to the direction of flight and thereby adding lift force. The other component, 215Ah, adds undesired drag force that acts against the thrust forward. The profile of aerodynamic forces developing at area 204A of airfoil shaped fuselage element 204 is similar to that developing on the upper face of an aerodynamic wing and the magnitude of combined lift vector 215A is largely affected by the airspeed over it, enhanced or magnified by the suction of fan 203. Further, the local air pressure flowing next to area 204A is relatively low due to the effect of the operation of fan 203, combined with the acceleration of air over the concave surface of 204A. As a result, the magnitude of combined vector 215A is relatively high and can reach a local coefficient pressure (Cp) as low as minus three (−3) and as a result, the drag force of aerodynamic vector component 215Ah is relatively large. There is a need to reduce the negative effect of drag force of aerodynamic vector component 215Ah as much as possible.

Figure 3A:
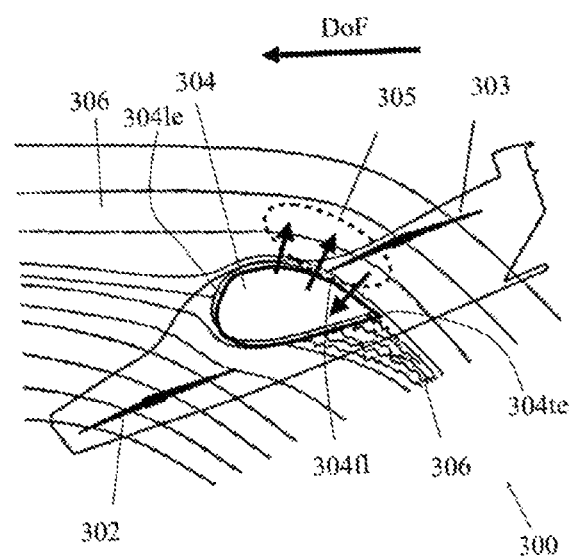
FIG. 3A schematically depicts a cross section of a VTOL according to embodiments of the present invention.

Reference is made now to FIG. 3A, schematically depicting cross section 300 of vehicle 10 (of FIG. 1), along cross section line A-A, with some changes, according to embodiments of the present invention. Different from the structure of cross section 200 of FIG. 2A, in cross section 300 of FIG. 3A rear fan 303 is elevated above the plane of rotation of front fan 302. Airfoil shaped fuselage element 304 is located between front fan 302 and rear fan 303 (with respect to the direction of flight DoF), with its aerodynamic leading edge 304*le* pointing towards forward fan 302 and located above the plane of rotation of fan 302, and its trailing edge 304*te* is located behind and below the front edge of the disk of rotation of fan 303, thereby the front edge of the disk of rotation of fan 303 is located next to position 304*fl* on the upper profile or camber of airfoil shaped fuselage element 304, between positions 304*le* and 304*te*. This arrangement changes the profile of distribution of aerodynamic forces along the upper profile of airfoil shaped fuselage element 304, compared to that depicted in FIGS. 2A and 2B, as is explained in details herein after. Schematic representation of the airflow path through fans 302 and 303 is depicted by flow lines 306, approaching vehicle cross section 300 from its forward end, flowing over airfoil shaped fuselage element 304 and through fans 302 and 303. Turbulent flow and/or separated flow of air behind airfoil shaped fuselage element 304 is depicted by turbulent-like lines 306.

Figure 3B:
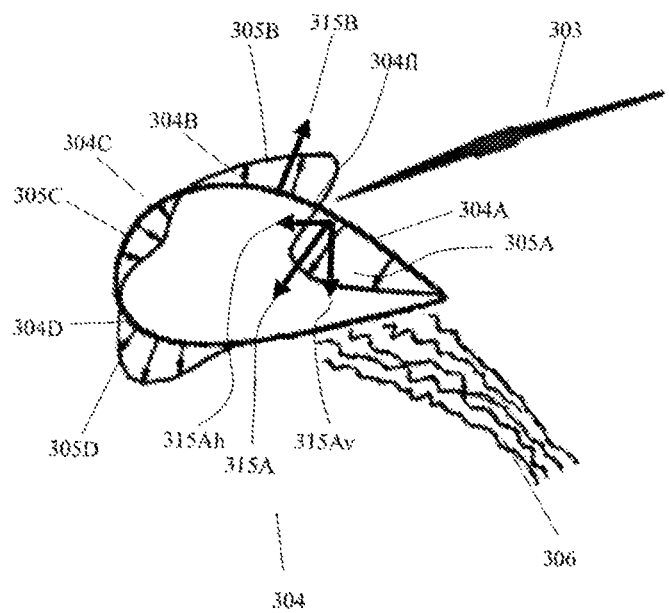
FIG. 3B depicts distribution of aerodynamic forces on an airfoil shaped fuselage element, according to embodiments of the present invention.

Reference is made now also to FIG. 3B, depicting distribution of aerodynamic forces perpendicular to the outer surfaces of airfoil shaped fuselage element 304 (i.e., lift forces), as developing in flow state depicted in FIG. 3A, for example during forward flight, according to embodiments of the present invention. Schematically, the vertical aerodynamic forces developing on the outer surface of airfoil shaped fuselage element 304 may be divided into four areas, as developing each on a different area on airfoil shaped fuselage element 304: 304A, 304B, 304C and 304D, with corresponding aerodynamic perpendicular force graphs 305A, 305B, 305C and 305D, respectively. The combined aerodynamic force of section 304C and the combined aerodynamic force of section 304D are similar to aerodynamic forces developing on sections 204B and 204C of FIG. 2B. However, due to the specific location of rear fan 303 with respect to the upper profile of airfoil shaped fuselage element 304, two different areas of aerodynamic forces develop on the upper part of element 304, front area 304B and rear area 304A, the border line between them 304*fl* is located against the front part of the rotation disk of rear fan 303.

The distribution graph of aerodynamic forces at area 304B is similar to that of area 204A of FIGS. 2A and 2B, due to similar aerodynamic parameters—speed of air flow over that area and reduced air pressure in front of fan blades of rear fan 303, yet with relatively smaller magnitude. The distribution of aerodynamic forces at area 304A, however, is subject to similar speed of airflow, but to higher air pressure relative to its magnitude upstream of fan 203, now being downstream of fan 303. Accordingly, the combined aerodynamic force 315B developing at area 304B is directed at a direction similar to that of combined aerodynamic force 215A of FIG. 2B but it is relatively much smaller due to the small portion of airfoil shaped fuselage element 304 at which it develops. The direction of combined aerodynamic force 315A is substantially opposite to that of 315B and therefore includes a forward component 315Ah that adds to the forward thrust instead of resisting it, as in the configuration of FIGS. 2A and 2B. The magnitude of force 315A may range from substantially zero to substantially similar in magnitude and opposite in direction to 315B. As a result, locating rear fan with respect to airfoil shaped fuselage element 304 so that the forward part of its disk of rotation is adjacent point 304fl on the upper profile of element 304 that is between leading edge 304le and trailing edge 304te reduces the undesired effect of the horizontal component of lift force developing on the upper profile of the airfoil shaped fuselage element. That is, in some configurations, the distribution of aerodynamic pressure on the upper profile defines a negative pressure area resulting in forces acting outward to the upper profile and a positive pressure area resulting in forces acting inward to the upper profile, and the forward edge of the rear vertical thrust fan may be positioned at a border line between the negative pressure area and the positive pressure area.

In certain embodiments of a VTOL vehicle, such as vehicle 10 of FIG. 1, air flowing via fans may be used for providing steering forces, as described, for example, in U.S. Pat. No. 6,464,166 to the inventor of the current patent application. As described there, sets of vanes may be disposed in the flow path of air in the fans and aerodynamic forces developing on these vanes may be directed to desired/ required directions, acting as steering forces.

Figure 4A:
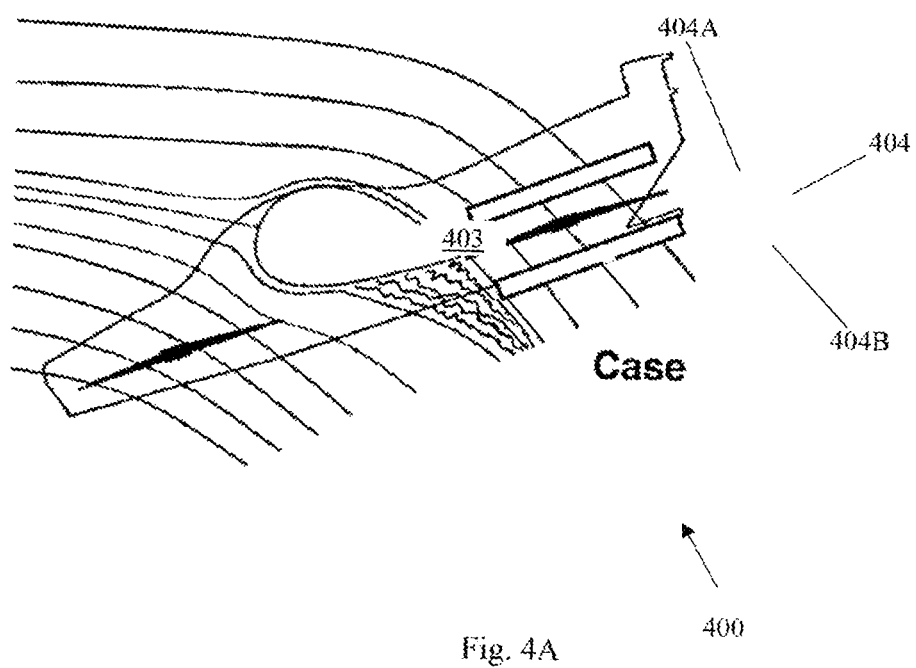
FIGS. 4A and 4B schematically present a cross section in a VTOL vehicle having a ducted rear fan with vanes, and cross section in the rear fan, respectively.
Figure 4B:
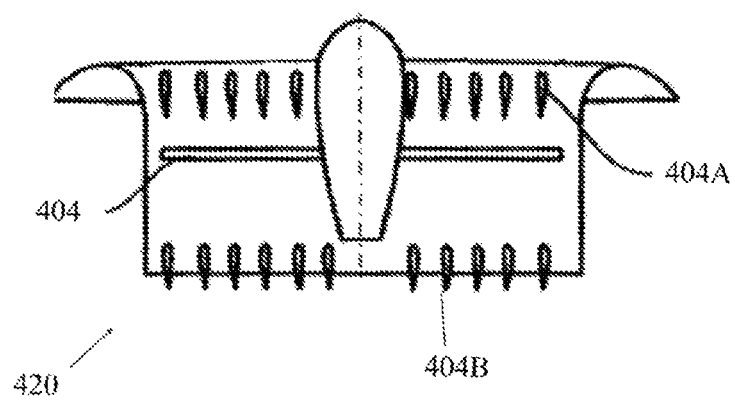

Reference is made now to FIGS. 4A and 4B, which schematically present cross section 400 in a VTOL vehicle having rear fan with vanes, and cross section in rear fan 420. Two sets of vanes 404A and 404B, are disposed in front and behind fan 404 with respect to the direction of air flow, respectively. Air flow via rear fan 404 is discussed in details above. The available aerodynamic effect of disposing of vanes sets 404A and 404B is dictated by the direction of the longitudinal axes of the vanes, with respect to the longitudinal axis of VTOL vehicle 400. For example, vanes with longitudinal axes directed substantially parallel to the longitudinal axis of the VTOL vehicle may provide aerodynamic forces substantially perpendicular to the longitudinal axis of the VTOL vehicle. Similarly, vanes with longitudinal axes directed substantially perpendicular to the longitudinal axis of the VTOL vehicle may provide aerodynamic forces substantially parallel to the longitudinal axis of the VTOL vehicle.

Figure 5:
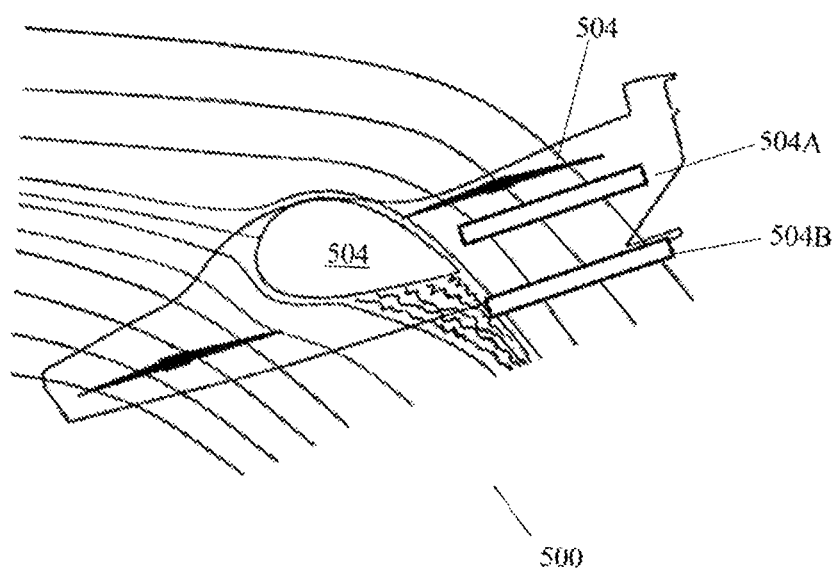
FIG. 5 schematically presents a cross section in a VTOL vehicle with rear fan equipped with two sets of vanes, according to embodiments of the present invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Reference is made now to FIG. 5, which schematically presents cross section 500 in VTOL vehicle with rear fan equipped with two sets of vanes, according to embodiments of the present invention. Cross section 500 of a VTOL vehicle, such as VTOL vehicle 10 of FIG. 1, comprise rear fan 504 with two sets of vanes 504A and 504B disposed within the airflow, and downstream of fan 504. As described above, with respect to FIGS. 3A and 3B, positioning of rear fan 504 higher than the trailing edge of airfoil shaped fuselage element 504 is advantageously contributing to the aerodynamic performance of the VTOL vehicle. In order to enable both the advantages stemming from elevated location of rear fan 504 and the steering forces provided by two sets of vanes disposed in the airflow of rear fan 504, and keeping any of vane sets 504A and 504B to not exceed out of the body contour line of the VTOL vehicle, rear fan 504 is located upstream of the two sets of vanes, 504A and 504B, thereby allowing positioning rear fan 504 with respect to the upper profile of airfoil shaped fuselage element 504 higher than its trailing edge. It is advantageous to locate vane sets 504A and 504B distant as much as possible from each other, to increase the available moment (couple) that is generated when sets 504A and 504B are rotated in opposite directions.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A vertical take-off and landing (VTOL) airborne vehicle comprising:
   a fuselage;
   a front vertical thrust fan positioned forward of the fuselage relative to a forward direction of flight, the front vertical thrust fan rotating in a first plane; and
   a rear vertical thrust fan positioned rearward of the fuselage, the rear vertical thrust fan rotating in a second plane above the first plane,
   wherein the fuselage comprises an airfoil shape along a longitudinal section, and wherein a distribution of aerodynamic pressure on an upper profile of the airfoil shape defines a negative pressure area resulting in forces acting outward to the upper profile and a positive pressure area resulting in forces acting inward to the upper profile, and a forward edge of the rear vertical thrust fan is positioned at a border line between the negative pressure area and the positive pressure area.

2. A VTOL airborne vehicle according to claim 1, wherein a leading edge of the airfoil-shaped fuselage faces the front vertical thrust fan and is positioned above the first plane.

3. A VTOL airborne vehicle according to claim 2, wherein a trailing edge of the airfoil-shaped fuselage is positioned behind and below the forward edge of the rear vertical thrust fan such that the forward edge of the rear vertical thrust fan is positioned adjacent the upper profile of the airfoil-shaped fuselage between the leading edge and the trailing edge.

4. A VTOL airborne vehicle according to claim 1, wherein a trailing edge of the airfoil-shaped fuselage is positioned behind and below a forward edge of the rear vertical thrust fan.

5. A VTOL airborne vehicle according to claim 1, further comprising two sets of vanes positioned in an airflow path of the rear vertical thrust fan, the two sets of vanes being positioned below the rear vertical thrust fan, wherein at least one of the two sets of vanes is positioned higher than a trailing edge of the airfoil-shaped fuselage.

6. A VTOL airborne vehicle according to claim 1, further comprising two sets of vanes positioned in an airflow path of the rear vertical thrust fan, the two sets of vanes being positioned below the rear vertical thrust fan.

7. A VTOL airborne vehicle according to claim 6, wherein the two sets of vanes are spaced a maximum amount possible while preventing either of the two vane sets from exceeding out of a body contour line of the VTOL airborne vehicle.

8. A vertical take-off and landing (VTOL) airborne vehicle comprising:

a fuselage having an airfoil shape along a longitudinal section;

a front vertical thrust fan positioned forward of the fuselage relative to a forward direction of flight, the front vertical thrust fan rotating in a first plane; and a rear vertical thrust fan positioned rearward of the fuselage, the rear vertical thrust fan rotating in a second plane above the first plane, wherein a leading edge of the airfoil-shaped fuselage faces the front vertical thrust fan and is positioned above the first plane, and wherein a trailing edge of the airfoil-shaped fuselage is positioned behind and below a forward edge of the rear vertical thrust fan, wherein a distribution of aerodynamic pressure on an upper profile of the airfoil shape defines a negative pressure area resulting in forces acting outward to the upper profile and a positive pressure area resulting in forces acting inward to the upper profile, and a forward edge of the rear vertical thrust fan is positioned at a border line between the negative pressure area and the positive pressure area.

9. A method of reducing drag in a vertical take-off and landing (VTOL) airborne vehicle with front and rear vertical thrust fans on opposite sides of a fuselage, the method comprising:

positioning the front vertical thrust fan forward of the fuselage relative to a forward direction of flight with the front vertical thrust fan rotating in a first plane; and positioning the rear vertical thrust fan rearward of the fuselage with the rear vertical thrust fan rotating in a second plane above the first plane, wherein the fuselage comprises an airfoil shape along a longitudinal section, wherein a distribution of aerodynamic pressure on the upper profile defines a negative pressure area resulting in forces acting outward to an upper profile of the airfoil shape and a positive pressure area resulting in forces acting inward to the upper profile, and wherein the step of positioning the rear vertical thrust fan comprises positioning a forward edge of the rear vertical thrust fan at a border line between the negative pressure area and the positive pressure area.

10. A method according to claim 9, further comprising facing a leading edge of the airfoil-shaped fuselage toward the front vertical thrust fan and positioning the leading edge of the airfoil-shaped fuselage above the first plane.

11. A method according to claim 10, further comprising positioning a trailing edge of the airfoil-shaped fuselage behind and below the forward edge of the rear vertical thrust fan such that the forward edge of the rear vertical thrust fan is positioned adjacent an upper profile of the airfoil-shaped fuselage between the leading edge and the trailing edge.

12. A method according to claim 9, further comprising positioning a trailing edge of the airfoil-shaped fuselage behind and below the forward edge of the rear vertical thrust fan.

* * * * *